(12) United States Patent
Ling et al.

(10) Patent No.: US 12,259,192 B2
(45) Date of Patent: Mar. 25, 2025

(54) MOBILE PHASE-CHANGE HEAT AND COLD STORAGE DEVICE

(71) Applicant: NANJING TECH UNIVERSITY, Jiangsu (CN)

(72) Inventors: Xiang Ling, Jiangsu (CN); Mingsheng Du, Jiangsu (CN); Hang Wang, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 360 days.

(21) Appl. No.: 17/791,426

(22) PCT Filed: Jul. 3, 2020

(86) PCT No.: PCT/CN2020/100028
§ 371 (c)(1),
(2) Date: Jul. 7, 2022

(87) PCT Pub. No.: WO2021/139122
PCT Pub. Date: Jul. 15, 2021

(65) Prior Publication Data
US 2023/0030059 A1 Feb. 2, 2023

(30) Foreign Application Priority Data
Jan. 7, 2020 (CN) .......................... 202010013869.5

(51) Int. Cl.
*F28D 20/00* (2006.01)
(52) U.S. Cl.
CPC ................................ *F28D 20/0034* (2013.01)

(58) Field of Classification Search
CPC ................ F28D 20/0034; F28D 20/021; F28F 2270/00; Y02E 60/14; F25D 3/00
(Continued)

(56) References Cited

U.S. PATENT DOCUMENTS

2015/0369542 A1* 12/2015 Minvielle ............. F28D 20/028
165/10
2016/0187013 A1* 6/2016 Becker .................. F24F 5/0017
62/99
(Continued)

FOREIGN PATENT DOCUMENTS

CN 102322760 A 1/2012
CN 103615754 A 3/2014
(Continued)

*Primary Examiner* — Steve S Tanenbaum
(74) *Attorney, Agent, or Firm* — MUNCY, GEISSLER, OLDS & LOWE, P.C.

(57) ABSTRACT

A mobile phase-change heat and cold storage device include heat transfer plates, a bracket, a casing, a main tube, a storage tank, and a phase-change working medium. Heat is stored and released by the phase-change working medium, and the main tube and casing provide an interface between the heat and cold storage device and the outside world. In the process of heat storage, vapor flows through the heat transfer plates via the main tube; heat is transferred to the phase-change working medium via the heat transfer plates, and is transported in a box body to a designated position; cold water flows through the heat transfer plates via the casing; heat is transferred from the phase-change working medium to the cold water via the heat transfer plates to obtain hot water; the phase-change working medium can release heat by exothermic solidification. The process of cold storage is similar thereto.

10 Claims, 6 Drawing Sheets

(58) Field of Classification Search
USPC .......................................................... 165/10
See application file for complete search history.

(56) References Cited

U.S. PATENT DOCUMENTS

2017/0276408 A1* 9/2017 Khalifa .................. F25B 21/02
2018/0135919 A1* 5/2018 Sun ....................... F28F 13/125
2019/0353432 A1* 11/2019 Kim ....................... F28F 9/013

FOREIGN PATENT DOCUMENTS

| CN | 104748192 | A |   | 7/2015  |            |
|----|-----------|---|---|---------|------------|
| CN | 204678943 | U |   | 9/2015  |            |
| CN | 106958898 | A |   | 7/2017  |            |
| CN | 207711757 | U |   | 8/2018  |            |
| CN | 109341396 | A | * | 2/2019  | F28D 20/021 |
| CN | 111121514 | A |   | 5/2020  |            |
| EP | 3396291   | A1| * | 10/2018 | F28D 20/021 |
| FR | 3053107   | A1| * | 12/2017 | F28D 20/021 |

* cited by examiner

MOBILE PHASE-CHANGE HEAT AND COLD STORAGE DEVICE

TECHNICAL FIELD

The present invention relates to a mobile phase-change heat and cold storage device, falling within the technical field of phase-change energy storage.

BACKGROUND ART

Energy is the foundation of human survival and development. The massive consumption of fossil energy makes the problems of energy shortage and environmental pollution increasingly prominent. China is a large energy consuming country, but in the process of energy utilization, there are phenomena such as low conversion efficiency and insufficient utilization. It is of great practical significance to improve the utilization rate of energy.

Energy storage plays a very important role in saving energy and improving energy utilization. The waste gas and waste heat generated in industrial production are directly discharged, resulting in a large amount of energy waste. The mobile phase-change heat and cold storage device has the characteristics of breaking the time and geographical boundaries between the heat or cold supply place and the user, and can stably output heat or cold at a desired temperature, which can effectively solve the discontinuity problem in the utilization of waste heat or redundant cold resources. In the present invention, both device mobility and energy storage are taken into consideration. A standard container is used as a heat and cold storage device, solving the transport problem, and reducing the cost. The advantages of a phase-change material, such as a high energy storage density and a phase-change process being approximately isothermal, are used to ensure the stability of the output of heat energy or cold energy. The present invention is simple and compact in structure, reliable in operation and suitable in cost; and has the advantages of a large heat transfer area, a high heat energy conversion speed and a high efficiency.

SUMMARY OF THE INVENTION

The technical problem to be solved by the present invention is to provide a mobile phase-change heat and cold storage device, which has a high overall energy storage density, convenient transportation, fast heat energy conversion speed and high efficiency, and can solve the problems of low heat and cold storage capacity, low cold and heat recovery efficiency, long charging and discharging time, etc. existing in the mobile heating and cooling device in prior art.

In order to solve the above technical problem, the technical solution adopted by the present invention is: a mobile phase-change heat and cold storage device, comprises a storage tank, a main tube, heat transfer plates, a phase-change working medium, a bracket, a casing, an insulation layer, and a box body. The storage tank, the main tube, the heat transfer plate, the phase-change working medium, the bracket, the casing, and the insulation layer are arranged inside the box body. The storage tank comprises a tank body and a base. An outer surface of the tank body is coated with the insulation layer. The heat transfer plates, the phase-change working medium and the bracket are arranged inside the tank body. The heat transfer plates are arranged on the bracket. The bracket is welded on a storage tank bottom plate. The main tube and the casing are respectively connected to the heat transfer plates. One side face of the tank body and the insulation layer is provided with a first aperture on an upper left side for the main tube to pass through, and a second aperture on a lower right side for the casing to pass through. The device utilizes the characteristics of phase-change working medium such as the phase-change energy storage and energy release being approximately isothermal and high energy storage density, to realize the rapid storage and off-site utilization of thermal energy and cold energy.

Wherein, the heat transfer plates communicate with each other via the main tube and the casing. Fins are present between two partition plates of the heat transfer plates. When storing heat, the vapor accesses the main tube, and flows through the heat transfer plates. Heat is transferred to the phase-change working medium via the heat transfer plates, so that the phase-change working medium stores heat by endothermic liquefaction. Vapor subjected to exothermic condensation flows out from the lower casing. When releasing heat, cold water accesses the casing and flows through the heat transfer plates. Heat is transferred from the phase-change working medium to the cold water via the heat transfer plates to obtain hot water. The phase-change working medium 4 releases heat by exothermic solidification, and the hot water flows out from the upper main tube. The cold storage process is similar to the heat storage process. The cold energy is transferred to the phase-change working medium by chilled water rather than vapor. When releasing cold, the phase-change working medium transfers the cold energy to the working fluid.

The base is a groove-shaped base. The tank body comprises the bottom plate, a front plate, a rear plate, side plates and a top plate. The second aperture for the casing to pass through is cut at the lower right side of the front plate. The first aperture for the main tube to pass through is cut at the upper left side. The first aperture has a diameter slightly greater than that of the main tube. The front plate, two side plates and the rear plate are welded on the bottom plate. The casing passes through the second aperture of the front plate and is welded. The top plate is formed by bending and machining multiple plate materials, and is liftable and slidable. The groove-shaped base has a grid arrangement and is welded on a lower surface of the bottom plate. A third aperture is provided in the middle of the grid for a hoisting rope to pass through.

The heat transfer plate comprises a cover plate, a partition plate, seals, fins, connecting tubes and ribs, wherein the partition plate, fins, the cover plate and the seals are brazed to form a heat transfer plate core; two gaps are provided at diagonally opposite corners of the heat transfer plate core; the seals are arranged at two sides of the heat transfer plate core and at the ends of the gaps; there is no seal at the upper and lower ends; and the fins have a length flush with the partition plate.

The heat transfer plate is assembled by argon arc welding of heat transfer plate core, two connecting tubes and several ribs. The connecting tube is sealed at one end and is open at the other end. One channel is milled out on each of the two connecting tubes. Two ends of the heat transfer plate core are respectively inserted into the channels of the two connecting tubes. The end with opening of the connecting tube faces the direction of the gap of the heat transfer plate core. The heat transfer plate core and the two connecting tubes are welded together. Then several ribs are longitudinally welded at equal intervals on both sides of the heat transfer plate core, and have a length within the range of the gap height of the heat transfer plate core.

The bracket is a groove-shaped bracket cut with several holes at a surface; an upper surface of the bracket is fixedly connected to the connecting tube of the heat transfer plates; and two sides are welded on the storage tank bottom plate.

The casing comprises an outer tube having a relatively large diameter and an inner tube having a relatively small diameter and a fork-shaped bracket. The outer tube is cut with through holes with equal number of and equal spacing from the heat transfer plates at one side, and is sealed at one end. The through hole has a diameter equal to the outer diameter of the connecting tube. Both ends of the inner tube are open, and one end is welded with the fork-shaped bracket. The diagonal length of the fork-shaped bracket is equal to the inner diameter of the outer tube. The end of the inner tube with the fork-shaped bracket extends into the outer tube. The opening at this end is between the last through hole and the penultimate through hole. A circular plate having an outer diameter equal to the outer diameter of the outer tube and an inner diameter equal to the outer diameter of the inner tube is welded to seal the other end of the outer tube. The lower connecting tube of the arranged heat transfer plates is inserted into the through hole of the casing, welded and sealed. The outer end opening of the inner tube is connected to a second quick connector.

The main tube is sealed at one end, and is opened at the other end. A part inside the storage tank is sealed at a port, and cut with through holes with equal number of and equal spacing from the heat transfer plates at one side. The through hole has a diameter equal to the outer diameter of the connecting tube, and a length equal to the total length of the casing. An upper connecting tube of the heat transfer plates extends into the through hole of the main tube, and is welded and sealed. A part outside the storage tank is opened at a port, and the opening is connected to a first quick connector.

The phase-change working medium can be phase-change materials such as water, sodium acetate trihydrate, sodium sulfate decahydrate, calcium chloride hexahydrate, paraffin (hexadecane, pentadecane), polyethylene glycol, fatty acid, high density polyethylene, and the like. The phase-change working medium can be added into the storage tank from the upper part of the storage tank from which the cover plate is removed. Vapor is passed through the heat transfer plates while adding the phase-change working medium. When the liquid level of the melted phase-change working medium is lower than the bottom of the front plate first aperture of the storage tank by a certain distance, the filling is stopped, and the top plate of the storage tank is covered after the filling is completed.

Outer surfaces around the storage tank and the upper and lower outer surfaces are wrapped with the insulation layer. The hoisting rope passes through the through holes of the groove-shaped base, and all the equipment is hoisted into the top-opening box 8. The front part of the box body is also processed into an open/closed type to install instrument equipment, etc. to form the mobile phase-change heat and cold storage device.

The materials of the heat transfer plate, the bracket, the casing, the main tube, and the storage tank can be aluminum alloy, carbon steel and stainless steel, etc. according to the requirements for heat and cold storage.

As a preference, the connecting tube and the heat transfer plates can be arranged in the width direction or in the length direction according to the actual working conditions. The connecting tube and the heat transfer plates arranged in the width direction is described above. When the connecting tube and the heat transfer plates are arranged in the length direction, several heat transfer plates can be arranged on the same connecting tube according to the specific length. In this case, the lower connecting tube is a casing structure of an inner tube and an outer tube in a coaxial line; two main tubes are T-shaped structures in the same width direction; fins are provided on both sides of the heat transfer plate; the rear ends of the connecting tube and the lower connecting tube are welded with a distance plate; and the distance plate is welded with the rear plate.

Compared with the prior art, the present invention has the following advantages and effects:

1. The phase-change working medium has high energy storage density, suitable phase-change temperature, fast heat charging and releasing speed and low cost, improving the heat storage and cold storage capacity of the mobile phase-change heat storage device, shortening the charging and releasing time, lowering time cost.
2. The liquid-solid two-phase transformation avoids the huge volume change in the phase transformation process. The equipment structure is more compact. The energy storage per unit volume is strengthened. The phase transformation process is approximately isothermal, and the output is stable.
3. The front plate of the storage tank is connected to the main tube by the first aperture. The main tube can expand freely. The influence of thermal stress on the structure of the equipment is weakened, and the equipment is more reliable. The costs of construction and maintenance are greatly reduced.
4. The heat transfer plate of mobile phase-change heat storage and cold storage device is easy to be standardized, and the processing speed is fast. The heat storage and cold storage device is a standardized container, and multiple heat and cold storage equipment can be used in parallel to increase the heat storage and cold storage capacity of the device. The main pipe and the casing are connected by the quick connector, further shortening the connection time, and improving the use efficiency. The heat and cold storage device is equipped with intelligent detection instrument for monitoring the operation status of the equipment in real time, with better safety.

Figure 1:
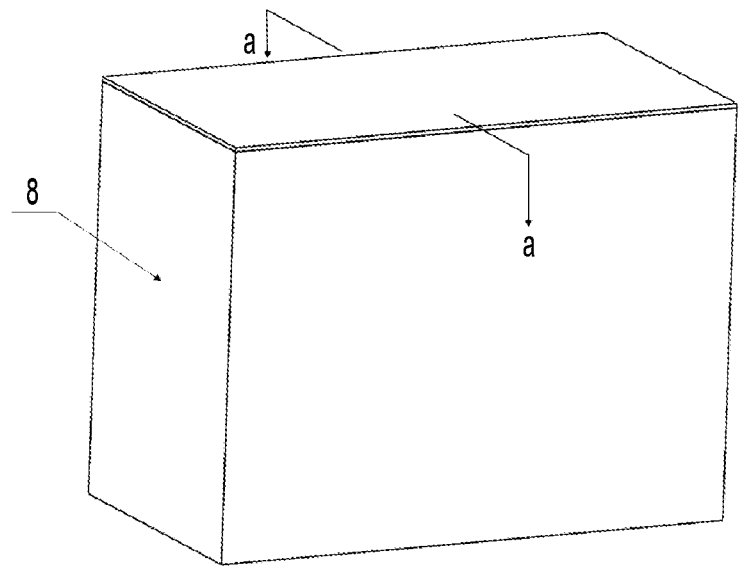
FIG. 1 is an external view of a mobile phase-change heat and cold storage device according to the present invention.
Figure 2:
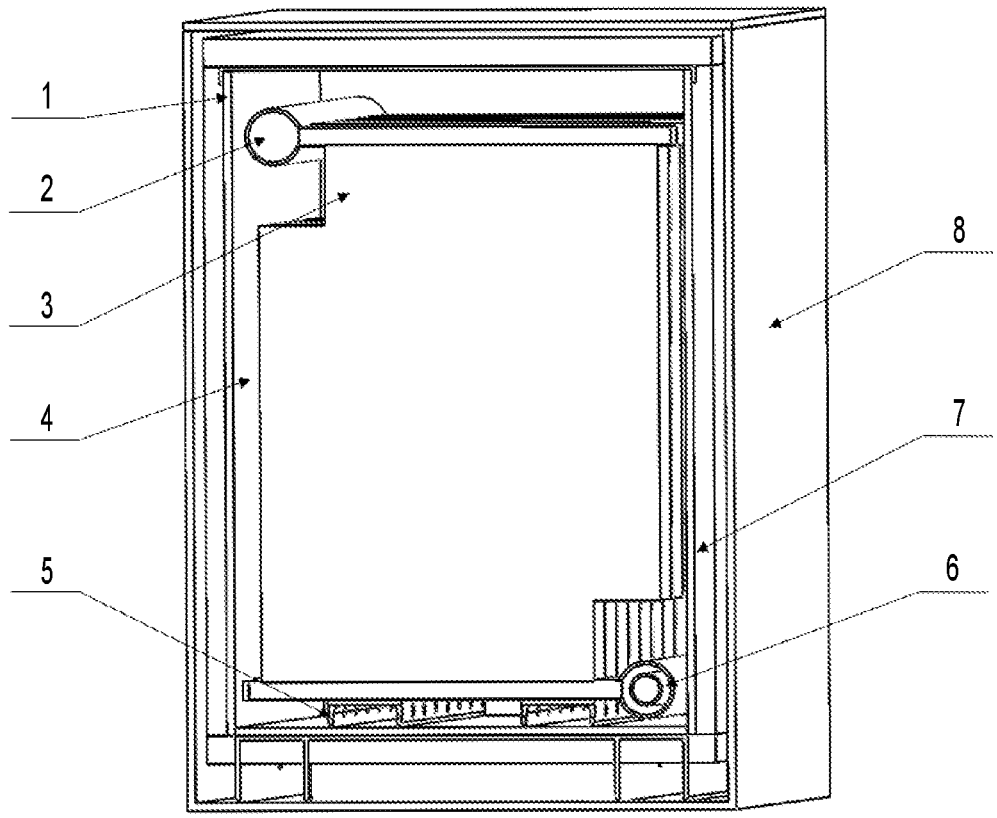
FIG. 2 is a sectional view of the mobile phase-change heat and cold storage device cut along a-a according to the present invention.
Figure 3:
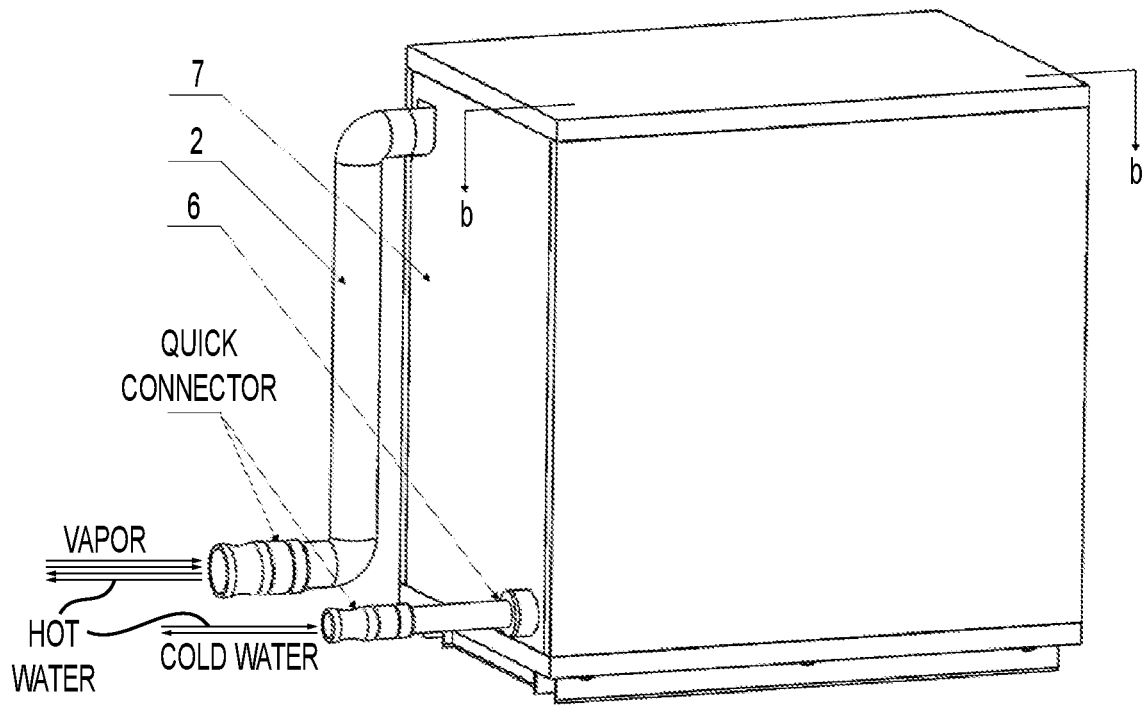
FIG. 3 is an external view of an inside of a box body of the mobile phase-change heat and cold storage device according to the present invention.

Wherein, 1, a storage tank; 2, main tube; 3, heat transfer plate; 4, phase-change working medium; 5, bracket; 6, casing; 7, insulation layer; and 8, box body;

- 1.1, storage tank bottom plate; 1.2, front plate; 1.3, side plate; 1.4, rear plate; 1.5, top plate; 1.6, base; 1.7, first aperture, 1.8, second aperture; 1.9, third aperture; and
- 2.1, first quick connector,
- 3.1, rib; 3.2, cover plate; 3.3, partition plate; 3.4, seal; 3.5, fin; and 3.6 connecting tube;
- 5.1, hole; and
- 6.1, outer tube; 6.2, fork-shaped bracket; 6.3, inner tube; 6.4, circular plate; 6.5, second quick connector; and 6.6, through hole.

DETAILED DESCRIPTION OF THE INVENTION

In order to further illustrate the content, features and functions of the present invention, the present invention will now be described in detail with reference to the accompanying drawings and specific embodiments, but the present invention is not limited to these embodiments.

As shown in FIGS. 1-4 and 10, a mobile phase-change heat and cold storage device comprises a storage tank 1, a main tube 2, heat transfer plates 3, a phase-change working medium 4, a bracket 5, a casing 6, an insulation layer 7 and a box body 8. The storage tank 1, the main tube 2, the heat transfer plates 3, the phase-change working medium 4, the bracket 5, the casing 6 and the insulation layer 7 are arranged inside the box body 8. The storage tank 1 comprises a tank body and a base 1.6. An outer surface of the tank body is coated with the insulation layer 7. The heat transfer plates 3, the phase-change working medium 4 and the bracket 5 are arranged inside the tank body. The heat transfer plates 3 are arranged on the bracket 5. The bracket 5 is welded on a storage tank bottom plate 1.1. The main tube 2 and the casing 6 are respectively connected to the heat transfer plates 3. One side face of the tank body and the insulation layer 7 is provided with a first aperture 1.7 on an upper left side for the main tube 2 to pass through, and a second aperture 1.8 on a lower right side for the casing 6 to pass through. The device utilizes the characteristics of phase-change working medium 4 such as the phase-change energy storage and energy release being approximately isothermal and high energy storage density, to realize the rapid storage and off-site utilization of thermal energy and cold energy.

Figure 5:
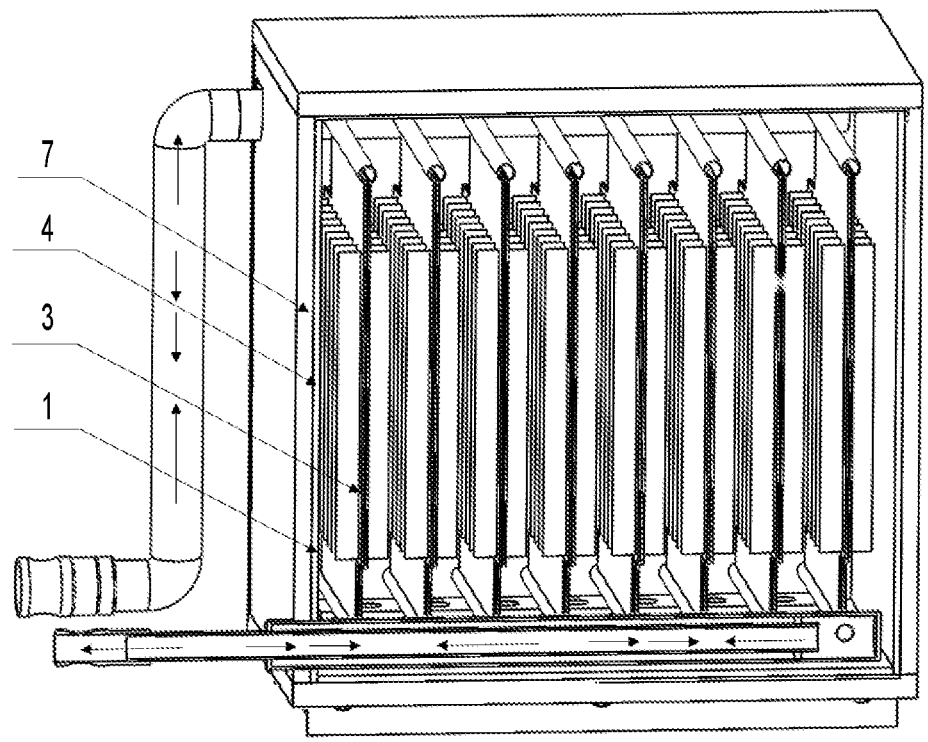
FIG. 5 is a cross-sectional view of the inside of the box body of the mobile phase-change heat and cold storage device cut along b-b according to the present invention.

As shown in FIG. 5, the heat transfer plates 3 communicate with each other via the main tube 2 and the casing 6. Porous fins 3.5 are present between two partition plates 3.3 of the heat transfer plates 3. When storing heat, the vapor accesses the main tube 2, and flows through the heat transfer plates 3. Heat is transferred to the phase-change working medium 4 via the heat transfer plates 3, so that the phase-change working medium 4 stores heat by endothermic liquefaction.

Vapor subjected to exothermic condensation flows out from the lower casing 6. When releasing heat, cold water accesses the casing 6 and flows through the heat transfer plates 3. Heat is transferred from the phase-change working medium 4 to the cold water via the heat transfer plates 3 to obtain hot water. The phase-change working medium 4 releases heat by exothermic solidification, and the hot water flows out from the upper main tube 2. By passing vapor in the upper part and water in the lower part, it is ensured that the two working fluids fill the inner space of the heat transfer plates 3, so that the heat transfer area is fully utilized and the heat transfer is enhanced. The cold storage process is similar to the heat storage process. The cold energy is transferred to the phase-change working medium 4 by chilled water rather than vapor. When releasing cold, the phase-change working medium 4 transfers the cold energy to the working fluid. The position of an inlet and outlet can be appropriately adjusted according to the situation when storing and releasing cold.

Figure 6:
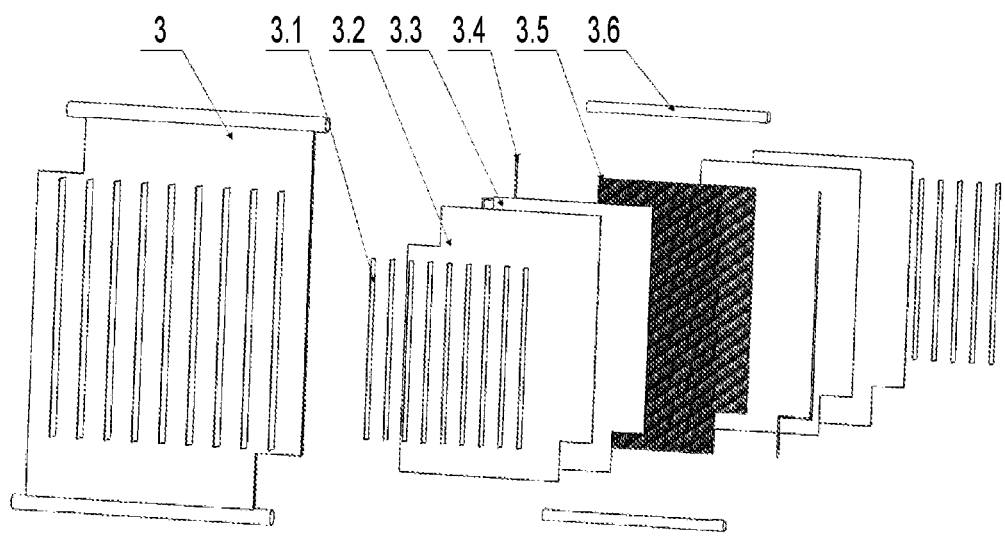
FIG. 6 is an external view and exploded view of heat transfer plates of the present invention.

As shown in FIG. 6, the heat transfer plate 3 is composed of a heat transfer plate core, two connecting tubes 3.6 and several rib 3.1. The partition plates 3.3, the fins 3.5, a cover plate 3.2 and seals 3.4 are brazed to form the heat transfer plate core. Two gaps are provided at diagonally opposite corners of the heat transfer plate core. The seals 3.4 are arranged at two sides of the heat transfer plate core and at the ends of the gaps. There is no seal 3.4 at the upper and lower ends. The fins 3.5 have a length flush with the partition plate 3.3. The connecting tube 3.6 is sealed at one end and is open at the other end. One channel is milled out on each of the two connecting tubes 3.6. Two ends of the heat transfer plate core are respectively inserted into the channels of the two connecting tubes 3.6. The end with opening of the connecting tube 3.6 faces the direction of the gap of the heat transfer plate core. The heat transfer plate core and the two connecting tubes 3.6 are welded together. Then several ribs 3.1 are longitudinally welded at equal intervals on both sides of the heat transfer plate core, and have a length within the range of the gap height of the heat transfer plate core. The fins 3.5 in the heat transfer plates 3 increase the turbulence degree of high-temperature vapor or cold water, strengthening the internal heat transfer. The contact side of the heat transfer plate 3 and the phase-change working medium 4 expands the heat conduction surface through the ribs 3.1, further strengthening the external heat conduction.

Figure 7:
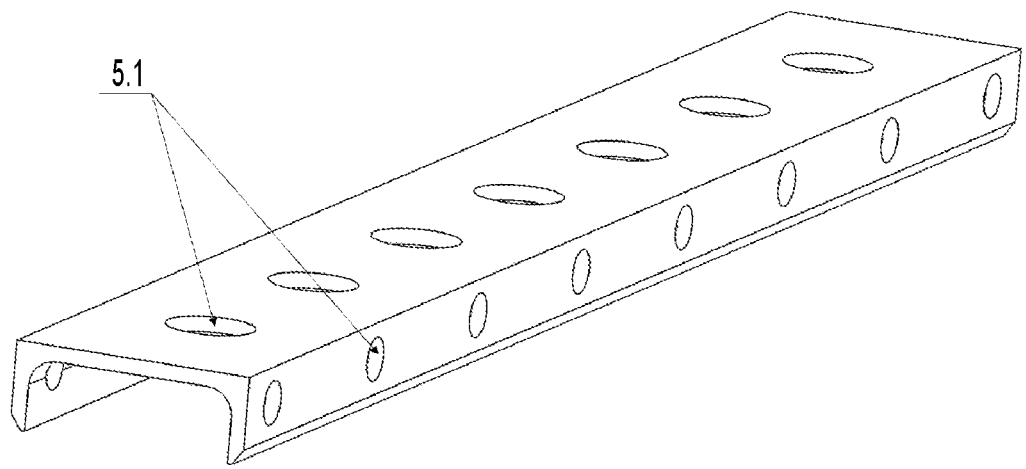
FIG. 7 is a structural schematic view of a bracket of the phase-change heat and cold storage device of the present invention.

As shown in FIG. 7, several holes 5.1 are cut on two side plates of the two groove-shaped brackets 5. The two side plates are welded on the storage tank bottom plate. Several heat transfer plates 3 are uniformly arranged on a top plate. The positions of the evenly distributed heat transfer plates 3 can be adjusted after the casing 6 and the main tube 2 are welded. The connecting tube 3.6 is fixed on the top plate of the bracket. Several holes 5.1 are cut in the bracket to ensure that the channel of the bracket is filled with the phase-change working medium, avoiding the stress deformation and damage of the bracket caused by solidification and expansion, and making full use of the space. At the same time, the position of the heat transfer plate 3 can be kept constant during the movement of the device to ensure the stability of the equipment.

Figure 8:
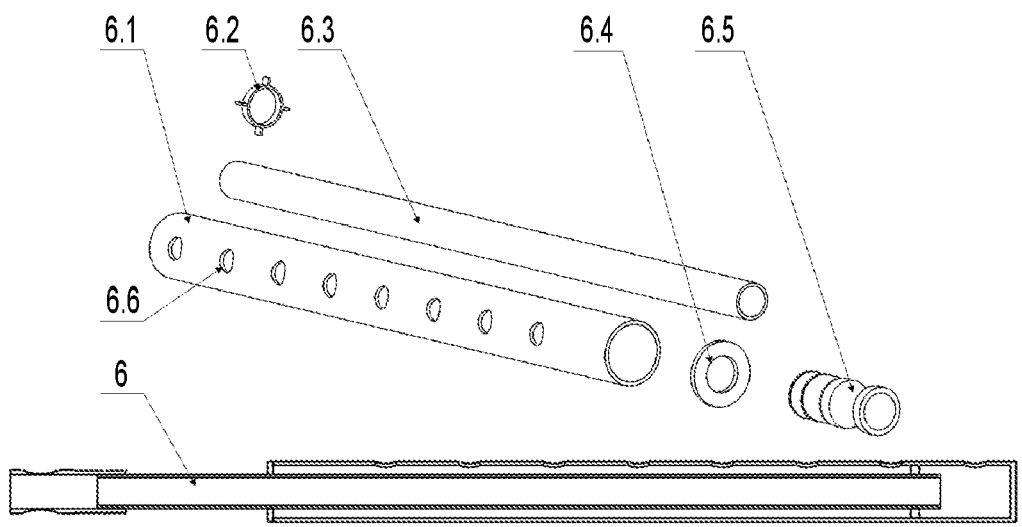
FIG. 8 is an exploded view and a cross-sectional view of a casing of the phase-change heat and cold storage device of the present invention.

As shown in FIG. 8, the casing 6 comprises an outer tube 6.1 having a relatively large diameter, an inner tube 6.3 having a relatively small diameter and a fork-shaped bracket 6.2. The outer tube 6 is cut with through holes 6.6 with an equal number of and equal spacing from the heat transfer plates 3 at one side, and is sealed at one end. The through hole 6.6 has a diameter equal to the outer diameter of the connecting tube 3.6. Both ends of the inner tube 6.3 are open, and one end is welded with the fork-shaped bracket 6.2. The diagonal length of the fork-shaped bracket 6.2 is equal to the inner diameter of the outer tube 6.1. The end of the inner tube 6.3 with the fork-shaped bracket 6.2 is extended into the outer tube 6.1, and the opening at this end is between the last and the penultimate through holes 6.6, ensuring that the vapor flowing in the main tube 2 or the cold water flowing in the casing 6 has the same flow path through each heat transfer plate 3, so that an outlet temperature of the fluid is stable within a small range, the strength between each component of the whole equipment is approximately equal, and each part is effectively utilized. Then a circular plate 6.4 having an outer diameter equal to the outer diameter of the outer tube 6.1 and an inner diameter equal to the outer diameter of the inner tube 6.3 is used to weld and seal the other end of the outer tube 6.1. The inner tube 6.3 extends out of the circular plate 6.4 by a certain distance. The lower connecting tube 3.6 of the arranged heat transfer plates 3 extends into the through hole 6.6 of the casing 6, and is welded and sealed. An outer end opening of the inner tube 6.3 is connected to a second quick connector 6.5, facilitating the connection of the device to an external working condition, thereby reducing the time cost, and improving the operating efficiency of the equipment.

Figure 9:
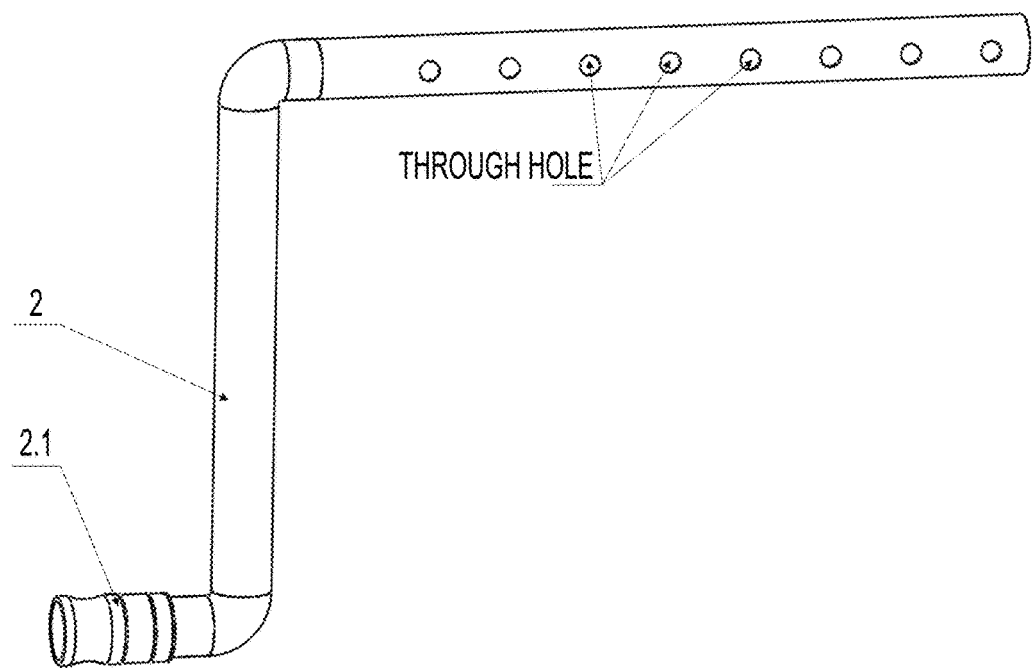
FIG. 9 is a structural schematic diagram of a main tube of the phase-change heat and cold storage device of the present invention.

As shown in FIG. 9, the main tube 2 is cut with through holes with equal number of and equal spacing from the heat transfer plates 3 are at one side of. The through hole has a diameter equal to the outer diameter of the connecting tube 3.6. One end is sealed, one end is opened. The length is equal to the total length of the casing 6. The upper connecting tube 3.6 of the arranged heat transfer plates 3 extends into the through holes of the main tube 2, and is welded and sealed. The opening is connected to the first quick connector 2.1, facilitating the connection of the device to the external working condition, thereby reducing the time cost, and improving the operating efficiency.

Figure 10:
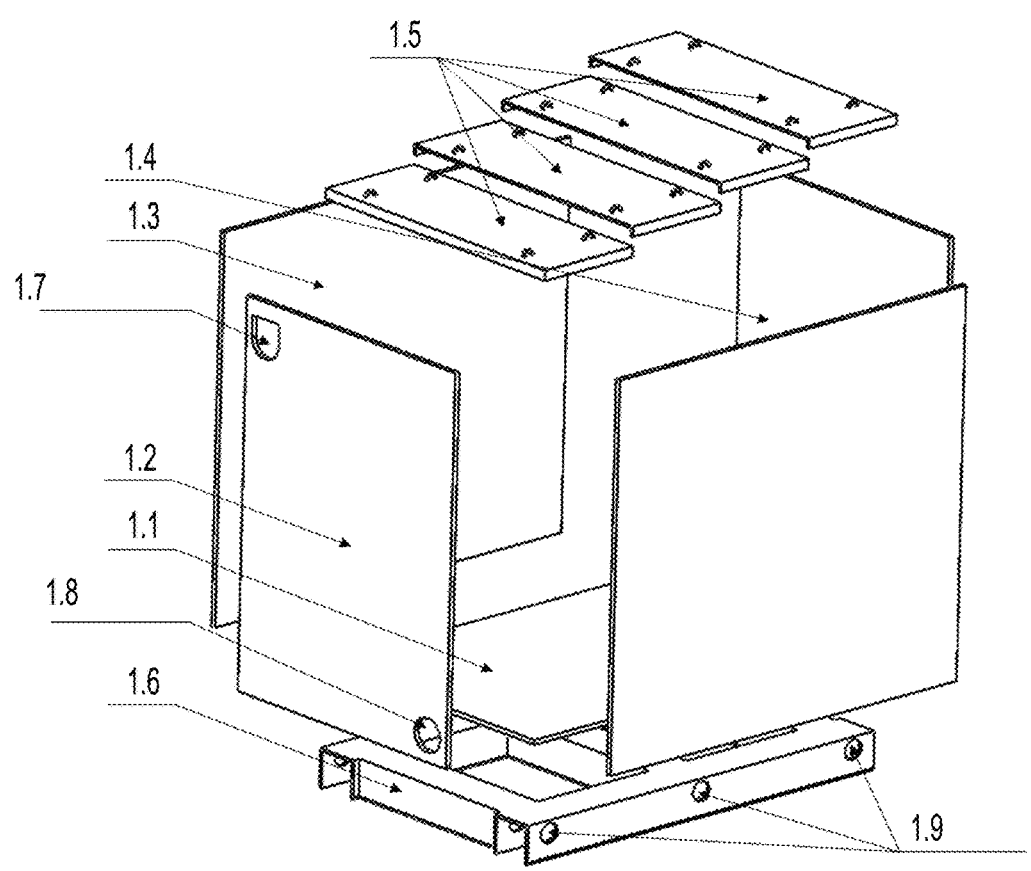
FIG. 10 is a structural schematic view of a storage tank of the phase-change heat and cold storage device of the present invention.

As shown in FIG. 10, the storage tank 1 is formed by welding a tank body and a groove-shaped base 1.6. The tank body comprises the bottom plate 1.1, a front plate 1.2, a rear plate 1.4, side plates 1.3 and a top plate 1.5. The front plate 1.2 is cut with the second aperture 1.8 at the position of the lower casing 6, and the first aperture 1.7 with a larger diameter at the position of the upper main tube 2. At this moment, the main tube 2 is heated and can expand freely. The influence of thermal stress on the structure of the equipment is weakened, and the equipment is more reliable. The costs of construction and maintenance are greatly reduced. The casing 6 and the main tube 2 are inserted into the second aperture 1.8 of the front plate 1.2 and the first aperture 1.7, welded with two side plates 1.3 and the rear plate 1.4 on the storage tank bottom plate 1.1. Then the casing 6 and the front plate 1.2 are seal-welded. An upper part is the top plate 1.5 formed by bending and machining multiple plate materials, and is liftable and slidable, facilitating the rapid filling of the phase-change energy storage material, the phase-change working medium 4. A lower part of the storage tank bottom plate 1.1 is a welded groove-shaped base 1.6 with a grid arrangement. The third aperture 1.9 is provided in the middle of the grid for a hoisting rope to pass through. The storage tank bottom plate 1.1 is welded on the groove-shaped grid base 1.6. The groove-shaped grid base 1.6 has uniform load distribution, good bearing capacity, and is convenient for movement and equipment maintenance.

The phase-change working medium 4 can be phase-change materials such as water, sodium acetate trihydrate, sodium sulfate decahydrate, calcium chloride hexahydrate, paraffin (hexadecane, pentadecane), polyethylene glycol, fatty acid, high density polyethylene, and the like. The phase-change working medium 4 is added into the storage tank 1 from the upper part of the storage tank 1 from which the cover plate 1.5 is removed. While adding the phase-change working medium, vapor is passed through the heat transfer plate 3 so that the phase-change working medium 4 melts into a liquid state and is filled in an inner space of the storage tank 1. The whole equipment has the maximum filling capacity. When the liquid level of the melted phase-change working medium 4 is lower than the bottom of the front plate 1.2 first aperture of the storage tank 1 by a certain distance, the filling is stopped, and the top plate 1.5 of the storage tank 1 is covered after the filling is completed.

Figure 4:
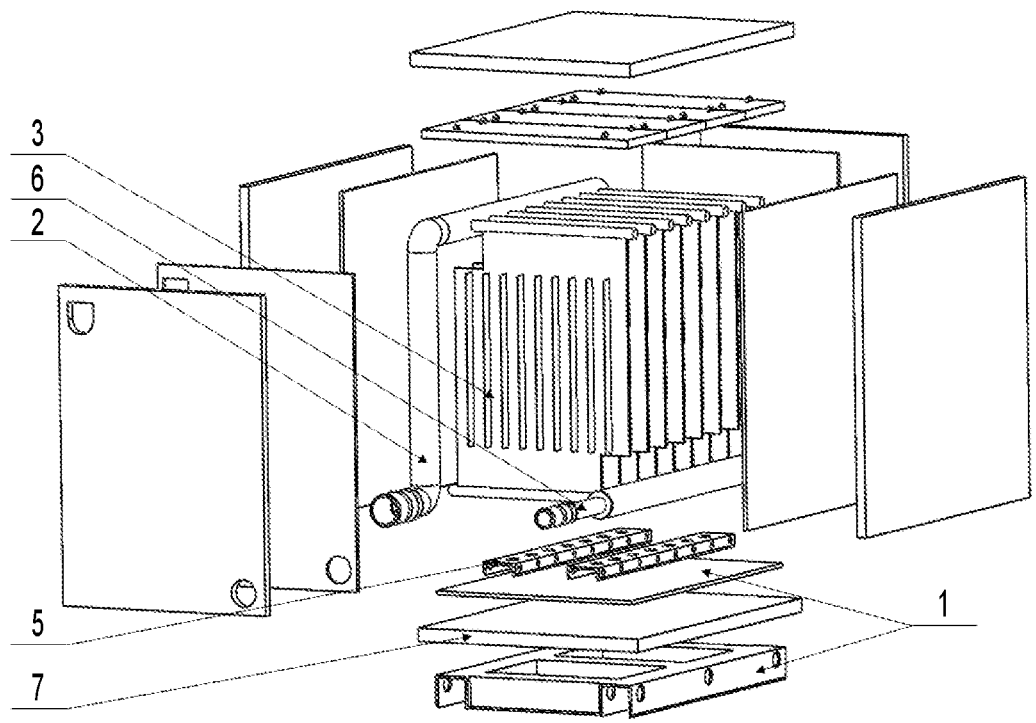
FIG. 4 is an exploded view of the inside of the box body of the mobile phase-change heat and cold storage device according to the present invention.

As shown in FIG. 4, outer surfaces around the storage tank 1 and the upper and lower outer surfaces are wrapped with the insulation layer 7. The hoisting rope passes through the third aperture 1.9 of the groove-shaped base 1.6, and all the equipment is hoisted into the top-opening box 8. The front part of the box body 8 is also processed into an open/closed type to install instrument equipment, etc. to form the mobile phase-change heat and cold storage device.

The materials of the storage tank 1, the main tube 2, the heat transfer plate 3, the bracket 5 and the casing 6 can be aluminum alloy, carbon steel, stainless steel, etc. according to the requirements of heat and cold storage. Selecting different materials can reduce the weight of the equipment and reduce the manufacturing cost while meeting the requirements for heat and cold storage.

Figure 11:
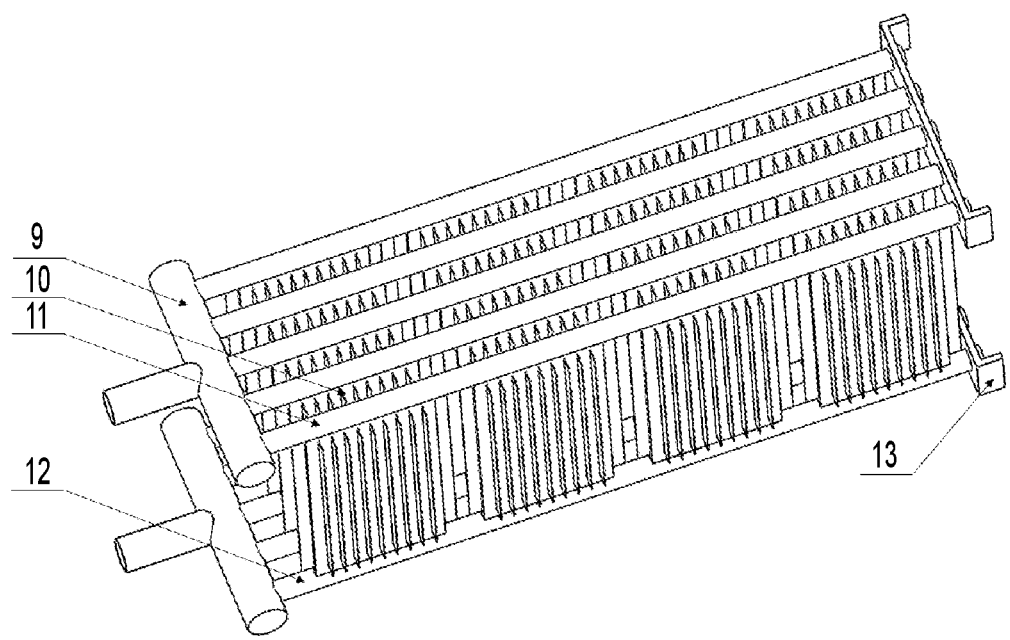
FIG. 11 is a schematic view showing the arrangement of connecting tubes and the heat transfer plates of the present invention along the length direction.

As shown in FIG. 11, as another example of the present invention, the connecting tube 11 and the heat transfer plates 10 can be arranged in the width direction or in the length direction according to the actual working conditions. The connecting tube 11 and the heat transfer plates 10 arranged in the width direction is described above. When the connecting tube 11 and the heat transfer plates 10 are arranged in the length direction, several heat transfer plates 10 can be arranged on the same connecting tube 11 according to the specific length. In this case, the lower connecting tube 12 is a casing structure of an inner tube and an outer tube in a coaxial line; two main tubes 9 are T-shaped structures in the same width direction; fins are provided on both sides of the heat transfer plate 10; the rear ends of the connecting tube 11 and the lower connecting tube 12 are welded with a distance plate; and the distance plate 13 is welded with the rear plate. When arranged along the length direction, the number of welds between the connecting tube 11 and the lower connecting tube 12 and the main tube 9 is less, technically easier to implement and improving sealing performance. The function of the lower connecting tube 12 as a casing structure is the same as that of the casing arranged along the width direction.

The above are only preferred examples of the present invention, and do not limit the present invention. Any simple modifications, changes and equivalent structural changes made to the above embodiments according to the technical essence of the present invention fall within the scope of the technical solutions of the present invention.

The invention claimed is:

1. A mobile phase-change heat and cold storage device, comprising a storage tank, a main tube, heat transfer plates, a phase-change working medium, a bracket, a casing, an insulation layer and a box body; wherein the storage tank, the main tube, the heat transfer plate, the phase-change working medium, the bracket, the casing and the insulation layer are arranged inside the box body; the storage tank comprises a tank body and a base; an outer surface of the tank body is coated with the insulation layer; the heat transfer plate, the phase-change working medium and the bracket are arranged inside the tank body; the heat transfer plate is arranged on the bracket; the bracket is welded on a storage tank bottom plate; the main tube and the casing are respectively connected to the heat transfer plates; one side face of the tank body and the insulation layer is provided with a first aperture on an upper left side for the main tube to pass through, and a second aperture on a lower right side for the casing to pass through.

2. The mobile phase-change heat and cold storage device of claim 1, wherein the bracket is a groove-shaped bracket cut with several holes at a surface; an upper surface of the bracket is fixedly connected to the connecting tube of the heat transfer plates; and two sides are welded on the storage tank bottom plate.

3. The mobile phase-change heat and cold storage device of claim 1, wherein the phase-change working medium is water, sodium acetate trihydrate, sodium sulfate decahydrate, calcium chloride hexahydrate, hexadecane, pentadecane, polyethylene glycol, fatty acid, or high-density polyethylene.

4. The mobile phase-change heat and cold storage device of claim 1, wherein a top portion or a front portion of the box body is openable.

5. The mobile phase-change heat and cold storage device of claim 1, wherein the base is a groove-shaped base; the tank body comprises the bottom plate, a front plate, a rear plate, side plates and a top plate; the second aperture for the casing to pass through is cut at the lower right side of the front plate; and the U-shaped groove for the main tube to pass through is cut at the upper left side; the U-shaped groove has a diameter slightly greater than that of the main tube; the front plate, two side plates and the rear plate are welded on the bottom plate; the casing passes through the second aperture of the front plate and is welded; the top plate is formed by bending and machining multiple plate materials, and is liftable and slidable; the groove-shaped base has a grid and is welded on a lower surface of the bottom plate; and a third aperture is provided in the middle of the grid for a hoisting rope to pass through.

6. The mobile phase-change heat and cold storage device of claim 5, wherein the heat transfer plate comprises the cover plate, the partition plate, seals, fins, connecting tubes, ribs and a distance plate, wherein the partition plate, fins, cover plate and seals are brazed to form the heat transfer plate core; the channel is milled on the connecting tube; two ends of the heat transfer plate core are respectively inserted into the connecting tube channel; the ribs are transversely welded at equal intervals at two sides of the heat transfer plate core; the connecting tubes comprises an upper connecting tube and a lower connecting tube; the lower connecting tube is a casing structure of an inner tube and an outer tube being coaxial; one end of each the upper connecting tube and the lower connecting tube is sealed, and the other end is open; the sealed end is welded to the distance plate; the open end is connected to the main tube; the main tube has a T-shaped structure in the same width direction; and the distance plate and the rear plate of the storage tank are welded together.

7. The mobile phase-change heat and cold storage device of claim 5, wherein the heat transfer plate comprises a cover plate, a partition plate, seals, fins, connecting tubes and ribs, wherein the partition plate, fins, the cover plate and the seals are brazed to form a heat transfer plate core; two gaps are provided at diagonally opposite corners of the heat transfer plate core; the seals are arranged at two sides of the heat transfer plate core and at the ends of the gaps; there is no seal at the upper and lower ends; and the fins have a length flush with the partition plate.

8. The mobile phase-change heat and cold storage device of claim 7, wherein the heat transfer plate is assembled by argon arc welding of the heat transfer plate core, the connecting tubes and ribs, wherein one end of the connecting tube is sealed and the other end is opened; a channel is milled on the connecting tube, two ends of the heat transfer plate core are respectively inserted into the connecting tube channel; the end with the opening of the connecting tube faces the direction of the gap of the heat transfer plate core; the heat transfer plate core and the connecting tubes are welded together; and ribs are longitudinally welded at equal intervals at two sides of the heat transfer plate core and have a length within the range of the height of the gap of the heat transfer plate core.

9. The mobile phase-change heat and cold storage device of claim 8, wherein the casing comprises an outer tube having a relatively large diameter, an inner tube having a relatively small diameter and a fork-shaped bracket, wherein the outer tube is sealed at one end, and is cut with through holes with equal number of and equal spacing from the heat transfer plates at one side; the through hole has a diameter equal to the outer diameter of the connecting tube; both ends of the inner tube are open, and one end is welded with the fork-shaped bracket; the diagonal length of the fork-shaped bracket is equal to the inner diameter of the outer tube; the end of the inner tube with the fork-shaped bracket is arranged between the first and second through holes at the sealed end of the outer tube, and the other end of the outer tube is seal-welded with a circular plate having an outer diameter equal to the outer diameter of the outer tube and an inner diameter equal to the outer diameter of the inner tube; the inner tube extends out of the circular plate by a certain distance; the lower connecting tube of the heat transfer plates extends into the through hole of the casing and is welded and sealed; and the outer end opening of the inner tube is connected to a second quick connector.

10. The mobile phase-change heat and cold storage device of claim 8, wherein the main tube is sealed at one end, and is opened at the other end; a part inside the storage tank is sealed at a port, and cut with through holes with equal number of and equal spacing from the heat transfer plates at one side; the through hole has a diameter equal to the outer diameter of the connecting tube, and a length equal to the total length of the casing; an upper connecting tube of the heat transfer plates extends into the through hole of the main tube, and is welded and sealed; and a part outside the storage tank is opened at a port; and the opening is connected to a first quick connector.

* * * * *